US008234012B1

(12) United States Patent
Kelekar

(10) Patent No.: US 8,234,012 B1
(45) Date of Patent: Jul. 31, 2012

(54) PREPARING A CHEMICAL DELIVERY LINE OF A CHEMICAL DISPENSE SYSTEM FOR DELIVERY

(75) Inventor: Rajesh Kelekar, Los Altos, CA (US)

(73) Assignee: Intermolecular, Inc., San Jose, CA (US)

( * ) Notice: Subject to any disclaimer, the term of this patent is extended or adjusted under 35 U.S.C. 154(b) by 684 days.

(21) Appl. No.: 12/239,567

(22) Filed: Sep. 26, 2008

(51) Int. Cl.
*G05D 9/00* (2006.01)

(52) U.S. Cl. ............................... 700/281; 222/1; 702/55

(58) Field of Classification Search .................. 700/120, 700/121, 287; 702/55; 73/1.73–1.74; 137/368–454
See application file for complete search history.

(56) References Cited

U.S. PATENT DOCUMENTS 5,591,299 A * 1/1997 Seaton et al. ................ 700/121
5,944,043 A * 8/1999 Glick et al. ...................... 137/1
6,168,048 B1 * 1/2001 Xu et al. .......................... 222/1
6,200,389 B1 * 3/2001 Miller et al. ................. 118/729
6,224,252 B1 * 5/2001 Munroe et al. ................ 366/132
2003/0180458 A1 * 9/2003 Sneh ......................... 427/248.1
2003/0186140 A1 * 10/2003 Fries .............................. 430/22
2005/0160983 A1 * 7/2005 Sneh ............................ 118/715
2006/0265098 A1 * 11/2006 Gould et al. ................. 700/121
2007/0163617 A1 * 7/2007 Ozaki et al. .................... 134/1.1
2007/0189934 A1 * 8/2007 King et al. .................... 422/105
2007/0260351 A1 * 11/2007 Curry et al. .................. 700/121

* cited by examiner

*Primary Examiner* — Ramesh Patel
*Assistant Examiner* — Anthony Whittington

(57) ABSTRACT

Method for preparing a chemical delivery line for delivery. In one implementation, the method may include starting a flow of a semiconductor solution from a vessel into the chemical delivery line coupled to the vessel, measuring a volume of the semiconductor solution flowing through the chemical delivery line, and performing a subsequent process when the volume of the semiconductor solution is equal to or greater than the volume of the chemical delivery line.

22 Claims, 7 Drawing Sheets

200

PREPARING A CHEMICAL DELIVERY LINE OF A CHEMICAL DISPENSE SYSTEM FOR DELIVERY

GOVERNMENT RIGHTS IN THIS INVENTION

This invention was made with U.S. government support under contract number H94003-07-C-0712. The U.S. government has certain rights in this invention.

BACKGROUND

1. Field of the Invention

Implementations of various technologies described herein generally relate to substrate processing.

2. Description of the Related Art

The following descriptions and examples do not constitute an admission as prior art by virtue of their inclusion within this section.

To achieve the desired performance enhancement for each successive generation of silicon integrated circuits (ICs), semiconductor manufacturing has become increasingly reliant on new materials and their integration into advanced process sequences. Unfortunately, typical semiconductor manufacturing equipment is not well suited for materials exploration and integration. Issues impacting the use of typical semiconductor manufacturing equipment include difficulty in changing process materials and chemicals rapidly, limited ability to integrate and sequence multiple materials or chemicals in a single reactor or process chamber, high equipment cost, large sample size (e.g. 300 mm wafers) and inflexible process/reactor configurations. To complement traditional manufacturing tools, a need has arisen for process equipment that facilitates fast testing of new materials and materials processing sequences over a wide range of process conditions.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1A:
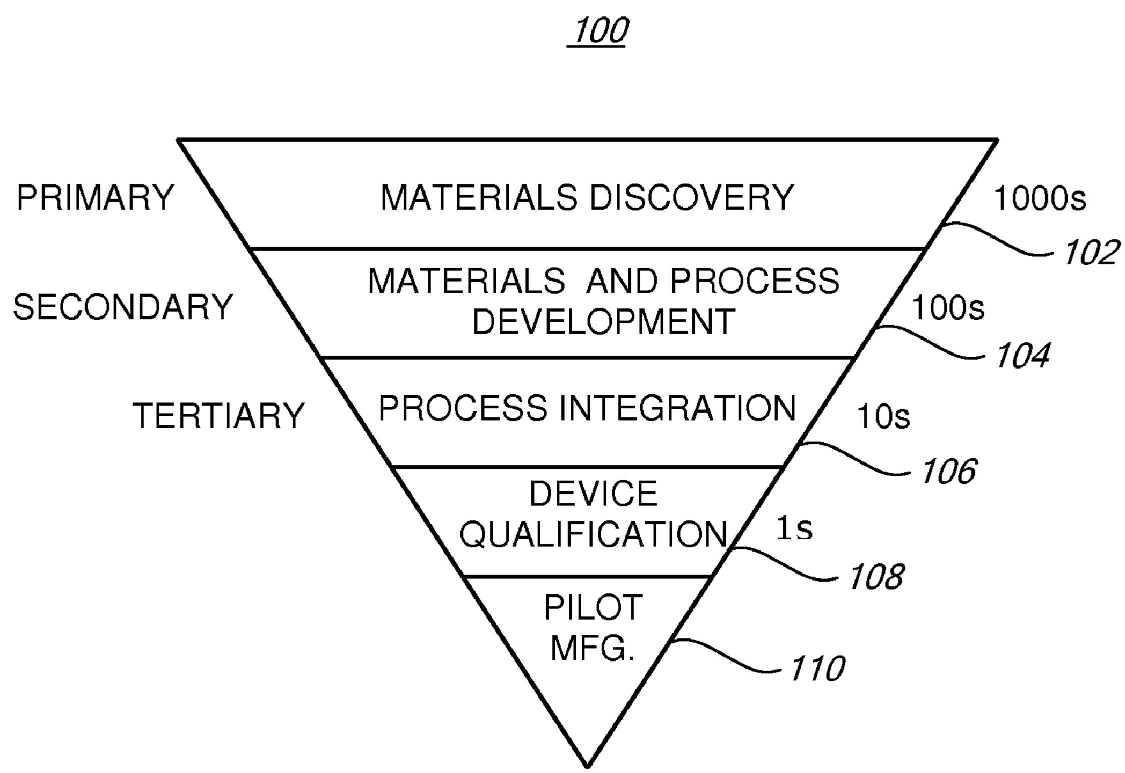
FIG. 1A illustrates a schematic diagram for implementing combinatorial processing in connection with implementations of various technologies described herein.

The following paragraphs provide a brief description of one or more implementations of various technologies and techniques directed at preparing a chemical delivery line to deliver a chemical in a chemical dispense system that may be part of a combinatorial processing tool. In preparing a chemical delivery line to dispense a new chemical, the chemical dispense system may verify that any liquid previously stored in the chemical delivery line has been completely removed and replaced with a new liquid. In one implementation, the chemical may be a semiconductor solution used in the combinatorial processing tool. A pressure regulator may be coupled to a pressure source to provide a vessel with a specified amount of pressure. The vessel may contain the semiconductor solution to be used in the chemical dispense system. The vessel may be coupled to a chemical delivery line, wherein a shutoff valve may provide access between the vessel and the chemical delivery line. The chemical delivery line may be coupled to a supply manifold having a plurality of valves. Each valve may be coupled to a dispense line, wherein each dispense line may be used to provide the chemical a path to one or more vessels and/or one or more reactors within the combinatorial processing tool. A pressure indicator and a flow meter may be coupled to the chemical delivery line to measure the pressure available at the chemical delivery line and the flow rate of the chemical, respectively.

A control device may be coupled to the pressure regulator, pressure indicator, flow meter, and the shutoff valve to prepare a chemical delivery line to deliver a chemical by replacing a chemical currently in the chemical delivery line with a new chemical. The control device may be configured to send a signal to the pressure regulator such that the pressure regulator may provide the specified amount of pressure to the vessel. The control device may then send a signal to the shutoff valve to provide access between the vessel and the chemical delivery line. The pressure from the pressure regulator may push the chemical out of the vessel and into the chemical delivery line. As a result, the flow meter may measure the flow rate of the chemical within the chemical delivery line, and the pressure indicator may measure the resulting pressure within the chemical delivery line. The control device may then determine the volume of the chemical being pushed into the chemical delivery line by integrating the flow rate received from the flow meter as a function of time. If the volume of the chemical from the vessel is equal to or greater than the known total volume of the chemical delivery line, the control device may then determine if the flow rate and pressure characteristics of the new chemical are stable. The control device may conclude that the new chemical has replaced the chemical originally in the chemical delivery line if the flow rate and the pressure have been determined to be stable.

Various implementations described herein may have many advantages, including minimizing contamination of chemicals being delivered to vessels or reactors for a combinatorial process from other chemicals used in a previous process, which may remain in the chemical dispense system. The ability to provide a chemical, free from remnants of previous chemicals stored in the chemical delivery line, may increase the accuracy in which a chemical reaction takes place for a combinatorial process. Various implementations described herein may also increase the accuracy in which a chemical reaction takes place by verifying that air bubbles do not exist within the chemical delivery line. Other advantages may include improving the consistency, repeatability, and accuracy of the combinatorial process by accurately measuring the volume of the chemical provided into the chemical delivery line and ensuring that air bubbles and/or other chemicals may not exist within the chemical delivery line.

One or more implementations of various techniques for preparing a chemical delivery line for in a chemical dispense system will now be described in more detail with reference to FIGS. 1-6 in the following paragraphs.

The discussion below is directed to certain implementations. It is to be understood that the discussion below is only for the purpose of enabling a person with ordinary skill in the art to make and use any subject matter defined now or later by the patent "claims" found in any issued patent herein.

Combinatorial processing may include any processing, including semiconductor processing, which varies the processing conditions across one or more substrates. As used herein, a substrate may be, for example, a semiconductor wafer, a portion of a semiconductor wafer, solar photovoltaic circuitry, or other semiconductor substrate. The term "substrate" includes a coupon, which is a diced portion of a wafer, or any other device on which semiconductor processes are performed. The coupon or substrate may optionally contain one die, multiple dice (connected or not through the scribe), or portion of die with useable test structures. In some implementations, multiple coupons or die can be diced from a single wafer and processed combinatorially.

Combinatorial processing is performed by varying processing conditions across multiple substrates, multiple regions of a single substrate, or a combination of the two. Processing conditions may include, for example, chemical formulation, fluid flow rates, temperatures, reaction times, concentrations, agitation or stirring, and the like. For example, a first region of a substrate may be processed using a first process condition (e.g., applying a chemical at a first temperature) and a second region of the substrate may be processed using a second process condition (e.g., applying the chemical at a second temperature). The results (e.g., the measured characteristics of the processed regions) are evaluated, and none, one, or both of the process conditions may be selected as suitable candidates for larger scale processing (e.g., further combinatorial processing or deposition on a full wafer).

Several combinatorial processing tools can be used. One type of tool may include a reactor block that has several openings (e.g., cylindrical openings) that define individual reactors on one or more substrates. Each of the openings may further include a sleeve that creates a seal with the substrate to contain processing fluids or chemicals within a single reactor (i.e., "site-isolated"). For example, a reactor block may include 28 openings that define 28 regions on a substrate. Each of the 28 regions can be processed using varying process conditions, or multiple regions can have the same processing conditions. For example, seven sets of processing conditions can be performed across four regions each. Each region can then be characterized using various techniques (e.g., electrical test, microscopy), and useful or beneficial techniques and/or conditions can be selected.

Other combinatorial processing may be performed in a manner that is not site isolated. For example, a wafer can be divided into many small coupons, each of which can be processed using different conditions. Using another example, a wafer can be processed using a gradient approach, where the processing varies over the substrate. These techniques may also be used in combination with site-isolated combinatorial techniques.

FIG. 1A illustrates a schematic diagram 100 for implementing combinatorial processing in connection with implementations of one or more technologies described herein. The schematic diagram 100 illustrates that the relative number of combinatorial processes that run with a group of substrates decreases as certain materials and/or processes are selected. Generally, combinatorial processing includes performing a large number of processes during a first screen, selecting promising candidates from those processes, performing the selected processing during a second screen, selecting promising candidates from the second screen, and so on. In addition, feedback from later stages to earlier stages can be used to refine the success criteria and provide better screening results.

For example, thousands of materials are evaluated during a materials discovery stage 102. Materials discovery stage 102 is also known as a primary screening stage performed using primary screening techniques. Primary screening techniques may include dividing wafers into coupons and depositing materials using varied processes. The materials are then evaluated, and promising candidates are advanced to the secondary screen, i.e., materials and process development stage 104. Evaluation of the materials may be performed using metrology tools such as electronic testers and imaging tools, e.g., microscopes.

The materials and process development stage 104 may evaluate hundreds of materials (i.e., a magnitude smaller than the primary stage) and may focus on the processes used to deposit or develop those materials. Promising materials and processes are again selected, and advanced to the tertiary screen or process integration stage 106, where tens of materials and/or processes and combinations are evaluated. The tertiary screen or process integration stage 106 may focus on integrating the selected processes and materials with other processes and materials.

The most promising materials and processes from the tertiary screen are advanced to device qualification stage 108. In device qualification, the materials and processes selected are evaluated for high volume manufacturing, which normally is conducted on full wafers within production tools, but need not be conducted in such a manner. The results are evaluated to determine the efficacy of the selected materials and processes. If successful, the use of the screened materials and processes can proceed to the manufacturing stage 110.

The schematic diagram 100 is an example of various techniques that may be used to evaluate and select materials and processes for the development of semiconductor devices. The descriptions of primary, secondary and subsequent screening and the various stages 102-110 are arbitrary and the stages may overlap, occur out of sequence, be described and be performed in many other ways.

Figure 1B:
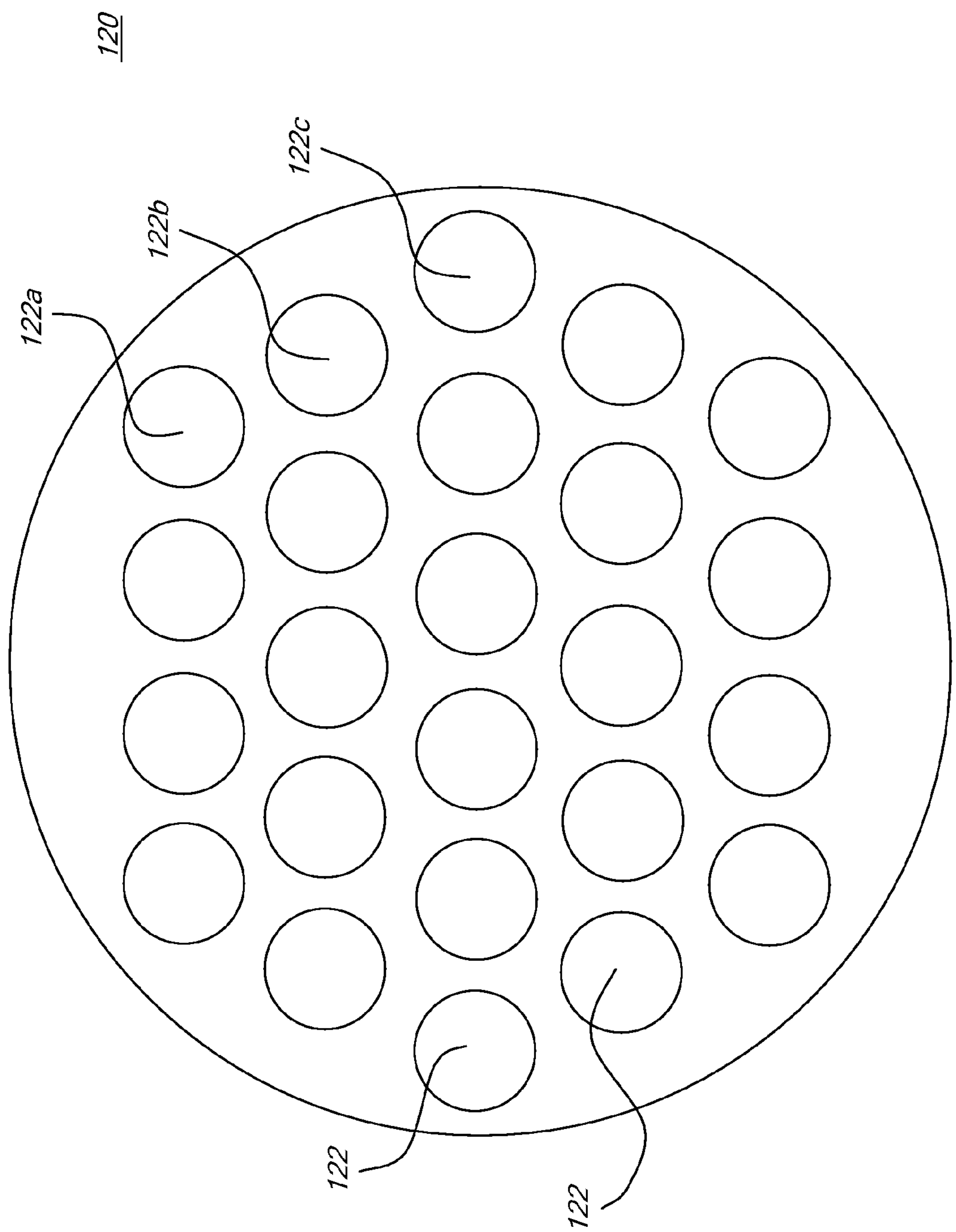
FIG. 1B illustrates an exemplary substrate containing multiple regions for combinatorial processing according to implementations of various technologies described herein.

FIG. 1B illustrates a substrate 120 having multiple regions for combinatorial processing in accordance with various techniques described herein. Substrate 120 includes several regions 122 on which semiconductor processes can be performed. For example, the regions **122*a*, 122*b*, and 122*c* may each have an electroless layer deposited on them. The region 122*a* may use a first chemical formulation, the region 122*b* may use a second chemical formulation, and the region 122*c*** may use a third chemical formulation. The resulting layers can be compared to determine the relative efficacy of each of the formulations. None, one, or more of the formulations can then be selected to use with further combinatorial processing or larger scale processing (e.g., manufacturing). Any process variable (e.g., time, composition, temperature) or process sequencing can be varied using combinatorial processing.

As discussed above, each of the regions 122 may or may not be site isolated. Site isolation refers to a condition where the regions 122 can be processed individually and independently without interference from neighboring regions. For example, one or more of the regions 122 may include a sleeve having an end that forms a fluid seal with the substrate 120. The sleeve is configured to contain processing fluids (e.g., chemicals), and is made from a material (e.g. polytetrafluoroethylene (PTFE)) that does not react with the processing chemicals used. The chemicals do not leak out of the region into which they were dispensed, and each region 122 can be processed and evaluated individually.

Figure 2:
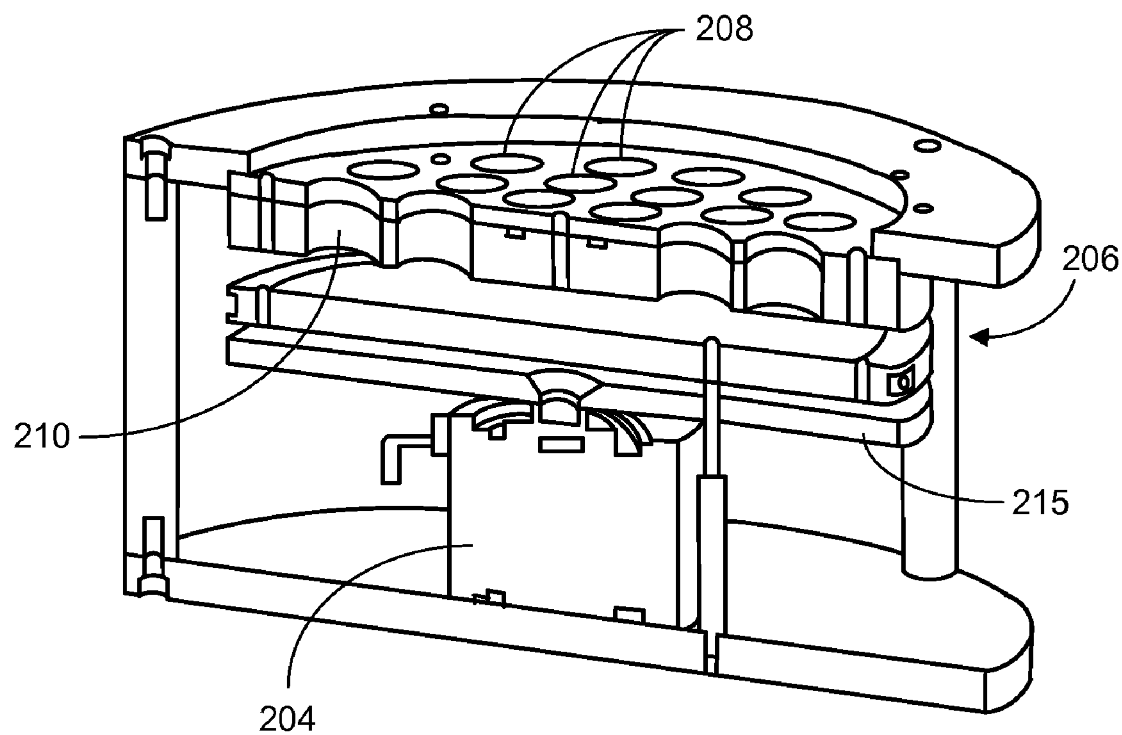
FIG. 2 illustrates a combinatorial processing tool in which various technologies may be incorporated and used in accordance with various techniques described herein.

Each of the regions 122 may be processed using a cell of a combinatorial processing tool, such as one illustrated in FIG. 2. The tool may be calibrated so that processing in each of the regions 122 may be consistent and comparable. Using various techniques described herein, pressure within the combinatorial processing tool may be monitored and the pressure supplied to the chemical supply vessel or bottle can be adjusted so that the flow rate in the flow cells stays consistent and calibrated. With these techniques, processed regions across one or multiple substrates may show reliable results that can be compared and characterized when performing combinatorial processing. For example, some of the implementations described herein can help provide consistent fluid delivery across multiple regions of a substrate. These implementations can improve combinatorial processing by improving repeatability and comparability of certain processing techniques.

Combinatorial Processing Tool

FIG. 2 illustrates a combinatorial processing tool 200 in which one or more implementations of various technologies described herein may be incorporated and used. Although various implementations described herein are with reference to the combinatorial processing tool 200, it should be understood that some implementations may use other types of combinatorial processing tools, such as a combinatorial processing tool with an open deck or a combinatorial processing tool that uses stirring.

The combinatorial processing tool 200 may include a reactor block 206 having a plurality of reactor cells 208. The reactor block 206 is configured to mate with a stage or chuck 204, which is configured to secure a substrate 215. The combinatorial processing tool 200 may also include a floating reactor sleeve or wall 210, which may be configured to float or be dynamically positionable in each reactor cell 208.

The combination of the reactor cell 208 that includes the floating sleeve 210 may thus form a reactor 208 that provides individual compliance of each reactor edge surface (formed by the floating sleeve 210) with a localized surface of the substrate 215. In one implementation, the compliance of each reactor sleeve 210 within the reactor 208 may be facilitated by an o-ring. In another implementation, the compliance of each reactor sleeve 210 may also be facilitated by a flexure-type mechanism, for example, a lip seal integrated directly into the sleeve wall. In some implementations, no sleeve is used and a seal is attached directly to the reactor block.

Use of the floating sleeves 210 in each reactor cell 208 allows for replacement of individual reactor walls that may become contaminated or otherwise unsuitable for continued use in a reactor. Further, the floating of each reactor cell 208 within the reactor block 206 provided by the floating sleeves 210 allows larger manufacturing tolerances of reactor components while still providing a high probability that a seal is achieved for each reactor.

Figure 3:
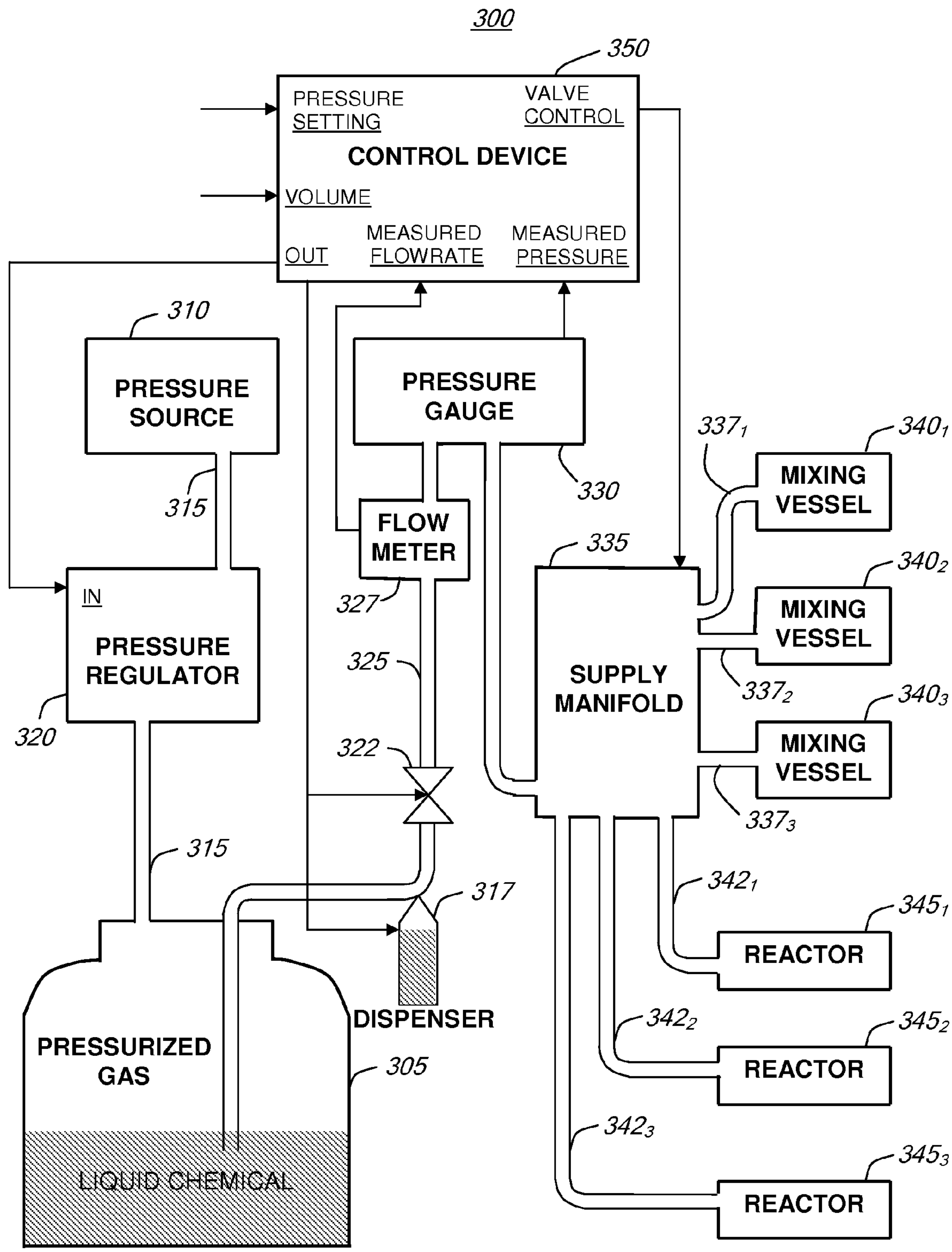
FIG. 3 illustrates a system for preparing a chemical delivery line to deliver a chemical in a chemical dispense system according to implementations of various technologies described herein.

FIG. 3 illustrates a combinatorial processing system 300 which may be used to prepare a chemical delivery line to deliver a chemical in a chemical dispense system according to implementations of various technologies described herein. The system 300 includes a supply vessel 305 which contains a fluid (e.g., a liquid chemical). A pressurized gas may be supplied to the supply vessel 305 via the gas supply line 315. The gas supply line 315 may be coupled to the pressure regulator 320, which may supply the pressurized gas to the supply vessel 305 through a gas supply line 315. The pressure regulator 320 may also be coupled to a pressure source 310 via the gas supply line 315. The pressure source 310 may be regulated by the pressure regulator 320 to provide a specified amount of pressurized gas to the supply vessel 305.

As illustrated in FIG. 3, a liquid chemical delivery line 325 may be coupled to or inserted into the supply vessel 305 such that a first end of the chemical delivery line 325 is immersed into the liquid chemical within the supply vessel 305. A second end of chemical delivery line 325 may be coupled to a supply manifold 335. A shutoff valve 322 may also be coupled to the chemical delivery line 325 to provide or deny access to the supply vessel 305. Another vessel, such as dispenser 317, may be coupled to the chemical delivery line 325, and it may contain the liquid chemical that may be used in preparing the chemical delivery line. In one implementation, the dispenser 317 may be a syringe having a barrel where the liquid chemical may be stored and a plunger that may push the liquid chemical out of the barrel.

The supply manifold 335 may contain a plurality of valves. The inputs of the valves within the supply manifold 335 may be coupled, via one or more chemical delivery lines 325, to a plurality of vessels containing chemicals (e.g., supply vessel 305). The outputs of the valves within the supply manifold 335 may be coupled to a plurality of mixing vessels $\mathbf{340_1}$-$\mathbf{340_3}$ via secondary supply lines $\mathbf{337_1}$-$\mathbf{337_3}$. Furthermore, the outputs of the valves within the supply manifold 335 may be coupled to a plurality of reactors $\mathbf{345_1}$-$\mathbf{345_3}$ via secondary supply lines $\mathbf{342_1}$-$\mathbf{342_3}$. Consequently, the mixing vessels $\mathbf{340_1}$-$\mathbf{340_3}$ and reactors $\mathbf{345_1}$-$\mathbf{345_3}$ may be configured to receive the fluids from the plurality of vessels via the secondary supply lines $\mathbf{337_1}$-$\mathbf{337_3}$ and $\mathbf{342_1}$-$\mathbf{342_3}$. Additionally, in some implementations, outputs (not shown) of the mixing vessels 340 may provide mixed chemicals directly to the reactors 345. In one implementation, the combinatorial processing system 300 may not have the supply manifold 335 coupled to the supply vessel 310; instead, the supply vessel 305 may be coupled directly to one or more secondary supply lines $\mathbf{342_1}$-$\mathbf{342_3}$ or secondary supply lines $\mathbf{337_1}$-$\mathbf{337_3}$.

According to one implementation, a pressure indicator 330 may be coupled to the chemical delivery line 325 such that the pressure indicator 330 measures a pressure within the chemical delivery line 325. The pressure indicator 330 may be any type of pressure gauge or pressure transducer that may be capable of determining the available pressure in an area. For example, the pressure indicator 330 may be a fluoro-polymer based pressure transducer.

The pressure indicator 330 may supply the pressure measurement reading to an input of a control device 350. The control device 350 may be, for example, a computer system containing one or more processors, memory (e.g., hard disk drive(s), random access memory, etc.), devices for receiving input from a user (e.g., keyboard, mouse, etc.), communication devices (e.g., network controllers, serial ports, etc.), and/or devices for outputting data (e.g., printers, monitors, data storage, etc.). In one implementation, the control device 350 may have an internal clock such that the time may be determined and stored into its memory at any moment.

A flow meter 327 may be coupled to the chemical delivery line 325 such that the flow meter 327 measures a flow rate of the fluid within the chemical delivery line 325. The flow meter 327 may, in some embodiments, be coupled to the chemical delivery line 325 closer to the supply vessel 305 than to the supply manifold 335. In one implementation, the flow meter 327 may be located as close to the supply vessel 305 as possible such that the flow rate may be determined as soon as a fluid enters the chemical delivery line 325. The sooner the flow rate of the incoming fluid in the chemical delivery line 325 is determined the more accurate the system 300 illustrated in FIG. 3 may be in preparing a chemical delivery line to deliver a chemical to the chemical delivery line 325 with the new fluid. In one implementation, at least one flow meter 327 may need to be installed on the chemical delivery line 325, but in other implementations one flow meter 327 may need to be installed on every supply vessel 305 that may exist in the combinatorial processing system 300.

The flow meter 327 may supply its flow rate readings to an input of the control device 350. The control device 350 may compute the volume of the fluid provided into the chemical delivery line 325 by integrating the flow rate readings received from the flow meter 327 as a function of time from when time equals zero to the present time.

$$\left(\text{e.g.} \int_a^r (\text{flow rate})\Delta t\right)$$

In one implementation, the calculated volume and its corresponding time may be stored within the memory of the control device 350.

The control device 350 may be configured to receive as input a volume of the chemical delivery line 325 for the process of replacing a chemical in the chemical dispense system. In one implementation, the volume may be specified by a user, and the volume may be compared to a volume of a fluid being supplied into the chemical delivery line 325.

The control device 350 may have a second input configured to receive a pre-determined pressure setting. In one implementation, the control device 350 may set the pressure regulator 320 at the pre-determined pressure setting in order to provide enough pressure to the supply vessel 305 such that the fluid may flow out of the supply vessel 305 and into the chemical delivery line 325.

An output of the control device 350 may be coupled to the supply manifold 335 and the shutoff valve 322. The control device 350 may be configured to control the opening and closing of valves within the supply manifold 335 and the shutoff valve 322. Additionally, the control device 350 may also have an output coupled to the pressure regulator 320 to regulate a pressure supplied from the pressure source 310. In one implementation, the control device 350 may also control the dispenser 317 such that the plunger of the dispenser 317 may be depressed to provide the fluid stored in its barrel into the chemical delivery line 325.

As will be described further below with respect to FIG. 4, the control device 350 may be configured to compare the calculated volume of the fluid flowing through the chemical delivery line 325 and the received volume of the chemical delivery line 325. Based on the results of the comparison, the control device 350 may be configured to check for flow rate and pressure stability in the chemical delivery line 325.

In some circumstances, the chemical delivery line 325 may contain remnants of a preexisting fluid within the chemical delivery line 325, which may contaminate the new fluid used during processing. This cross-contamination may compromise the integrity of the processed regions of a substrate. Thus, in combinatorial processing tools, in order to reliably and consistently process multiple regions of a substrate, it may be desirable to ensure that the chemical delivery line 325 only contains the new fluid for the combinatorial process.

Implementations described herein provide techniques and devices for providing a specified volume of a new fluid into the chemical delivery line 325, checking the flow rate stability, and checking the pressure stability of the fluid in the chemical delivery line 325. In one implementation, the specified volume of the new fluid provided and the flow rate stability may be used to indicate that the old fluid has been replaced with the new fluid. In another implementation, the pressure stability and the flow rate stability of the fluid may be used to indicate that there are no bubbles contained in the new fluid. For example, as described regarding FIG. 5, stability can be determined by examining flow rates over time and determining whether there have been or continue to be large changes in flow rate.

Replacing a Chemical in a Chemical Delivery Line

Figure 4:
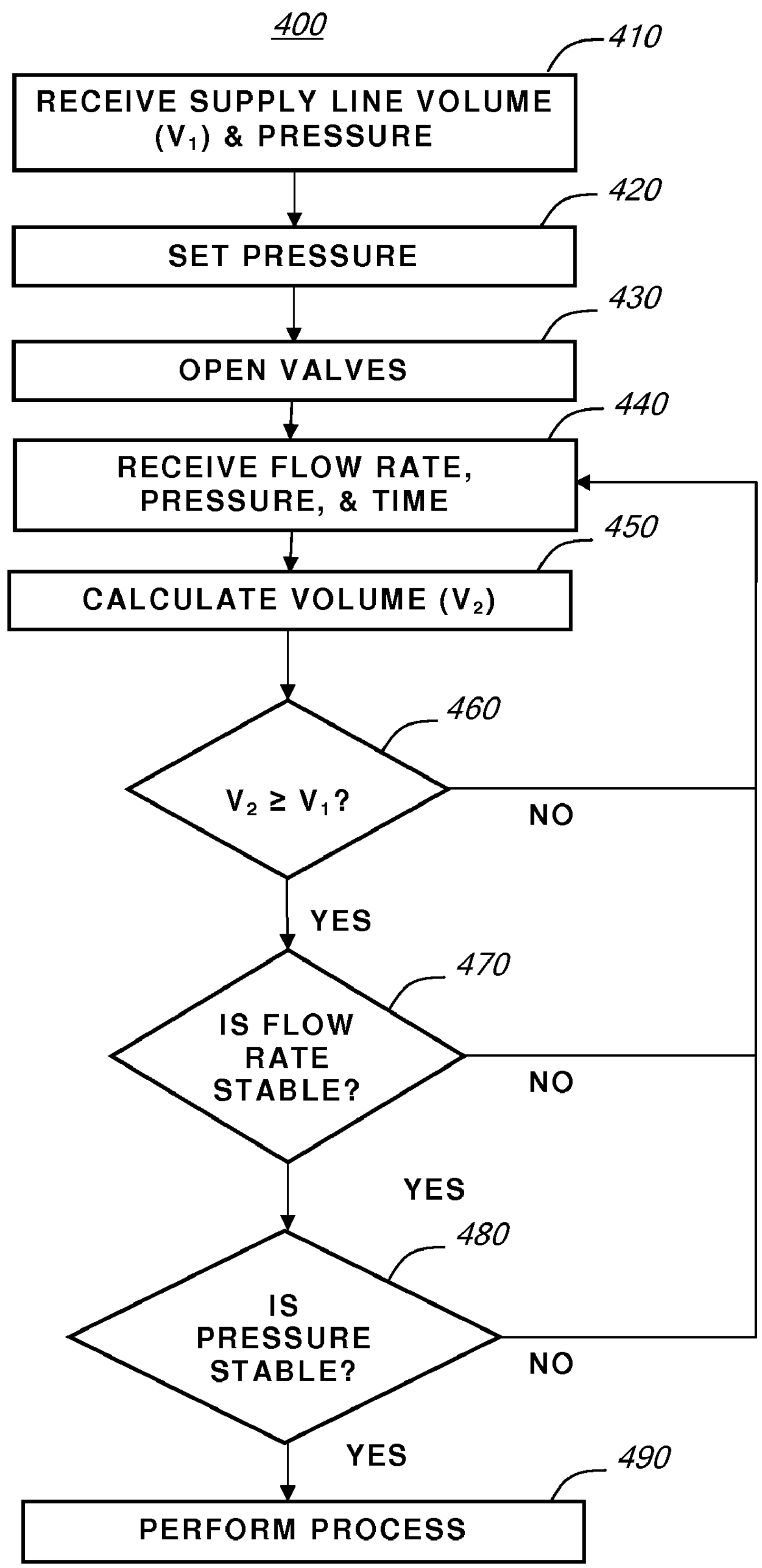
FIG. 4 illustrates a flow diagram of a method for preparing a chemical delivery line to deliver a chemical in a chemical dispense system according to implementations of various techniques described herein.

FIG. 4 illustrates a method 400 for replacing a chemical in a chemical delivery line of a chemical dispense system in accordance with implementations of various techniques described herein. Method 400 may be executed by the control device 350 illustrated in FIG. 3.

At step 410, the control device 350 may receive a volume ($V_1$) of the chemical delivery line 325 and a pressure value specified from a user. In one implementation, the volume of the chemical delivery line 325 may be a known value measured in milliliters, cubic millimeters, or the like. The pressure value may be determined based on a fluid flow rate requirement or a chemical reaction pressure requirement for the combinatorial process. For example, a certain pressure provided to the supply vessel 305 may result in a certain flow rate of the fluid in the chemical delivery line 325. The resulting fluid flow rate may be required to induce a chemical reaction in the mixing vessel 340 or the reactor 345.

At step 420, the control device 350 may send a signal to the pressure regulator 320 to regulate the pressure from the pressure source 310 such that the user specified amount of pressure may be provided to the supply vessel 305.

At step 430, the control device 350 may send a signal to the shutoff valve 322 such that the shutoff valve 322 may open and provide the supply vessel 305 access to the chemical delivery line 325. The control device 350 may also send a signal to the supply manifold 335 to open one or more valves such that the fluid being pushed out of the supply vessel 305 may be provided a dispense path to discard any unwanted fluids from the chemical delivery line 325. In one implementation, the unwanted fluid may include remnants of a fluid that were previously stored in the chemical delivery line 325 from a past combinatorial process. Although the fluid in the chemical dispense system has been described to have been provided from the supply vessel 305, it should be noted that in some implementations the fluid may be provided by a dispenser 317 that may be coupled to the chemical delivery line 325. In this case, the control device 350 may send a signal to a motor that may be coupled to the plunger of the dispenser 317 to push the plunger. As a result, the fluid stored within the barrel of the dispenser 317 may then flow into the chemical delivery line 325.

At step 440, the control device 350 may receive a flow rate measurement from the flow meter 327, a pressure measurement from the pressure indicator 330, and a time in which each measurement was received from its internal clock.

At step 450, the control device 350 may calculate the volume ($V_2$) of the fluid being pushed into the chemical delivery line 325. In calculating the volume ($V_2$), the control device 350 may integrate the flow rate received from the flow meter 327 as a function of time.

At step 460, the control device 350 may determine if the volume pushed into the chemical delivery line 325 ($V_2$) is equal to or greater than the volume of the chemical delivery line 325 received from the user at step 410. If $V_2$ is less than $V_1$, the control device may return to step 440 and continue receiving data pertaining to the flow rate and the pressure of the fluid provided into the chemical delivery line 325. If, however, $V_2$ is equal to or greater than $V_1$, the control device 350 may proceed to step 470 and determine if the flow rate is stable. In one implementation, the control device 350 may determine that the chemical in the chemical delivery line has been effectively replaced after $V_2$ is determined to be equal to or greater than $V_1$. Here, the control device 350 may determine that since the volume provided into the chemical delivery line 325 is equal to or greater than the known volume of the chemical delivery line 325, all remnants of the preexisting fluid in the chemical delivery line 325 must have been pushed out of the chemical delivery line 325 by the new fluid. In this implementation, the control device 350 may proceed to step 490 after determining that the chemical in the chemical delivery line has been replaced with the new delivery line.

At step 470, the control device 350 may determine if the flow rate is stable using a method described later in FIG. 5. If the flow rate is not stable, the control device 350 may again return to step 440 and continue receiving data pertaining to the flow rate and the pressure of the fluid pushed into the chemical delivery line 325. If, however, the flow rate is determined to be stable, the control device 350 may proceed to step 480 and determine if the pressure is stable. In one implementation, the flow rate stability may be used to verify that all remnants of the preexisting fluid in the chemical delivery line 325 have been pushed out of the chemical delivery line 325 by the new fluid. A determination that the flow rate is stable may indicate that the chemical delivery line 325 is composed of one uniform fluid. Conversely, a determination that the flow rate is unstable may indicate that the fluid in the chemical delivery line 325 is not uniform, i.e., it may contain a mixture of the preexisting fluid and the new fluid. The uniform fluid may ensure that the combinatorial processing of multiple regions may occur without contamination from a residual semiconductor solution from a previous process.

At step 480, the control device 350 may determine if the pressure is stable using a method described later in FIG. 5. If the pressure is not stable, the control device 350 may again return to step 440 and continue receiving data pertaining to the flow rate and the pressure of the fluid pushed into the chemical delivery line 325. If, however, the pressure is determined to be stable, the control device 350 may proceed to step 490. In one implementation, a determination that the pressure is stable may indicate that air pockets or bubbles are no longer present in the new fluid in the chemical delivery line 325. In another implementation, a determination that the flow rate is stable at step 470 may also indicate that air pockets or bubbles are no longer present in the new fluid in the chemical delivery line 325. The fluid that may be free of bubbles may ensure that the combinatorial processing of multiple regions may occur without interference from one or more bubbles stored within the chemical delivery line 325.

At step 490, the control device 350 may determine that the chemical delivery line has been properly prepared for delivery and is now ready to be used in performing a subsequent combinatorial process. In one implementation, the control device 350 may close the supply manifold valves and the shutoff valve that may have been opened at step 430. The valves may be closed to preserve the fluid uniformity of the chemical delivery line 325. The subsequent process may include opening an alternate dispense valve such that the fluid in the chemical delivery line may be routed to a destination vessel that may be used for a combinatorial process as described in FIGS. 1-2.

Determining Flow Rate and Pressure Stability

Figure 5:
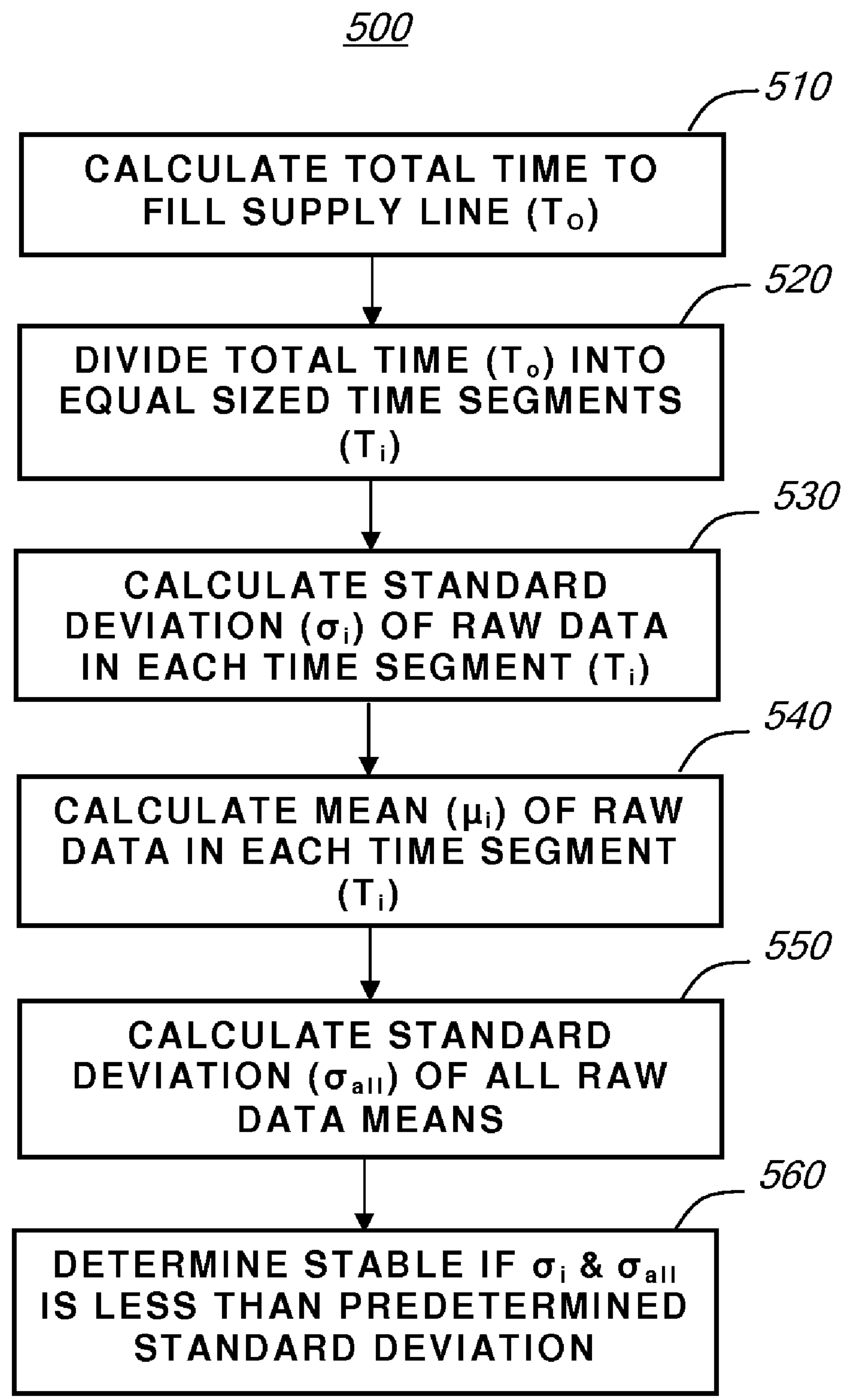
FIG. 5 illustrates a flow diagram of a method for determining whether flow rate or pressure data has stabilized according to implementations of various techniques described herein.

FIG. 5 illustrates a method 500 for determining the stability of the flow rate and the pressure in a chemical delivery line of a chemical dispense system in accordance with implementations of various techniques described herein. Method 500 may be executed by the control device 350 as illustrated in FIG. 3. Method 500 may be used to determine the stability of the flow rate and/or the pressure in the chemical delivery line 325. In some embodiments, stability can be determined by examining the flow rate over time and looking for the absence of large deviations (e.g., spikes) in the flow rate.

At step 510, the control device 350 may calculate the total time ($T_o$) that expired while the provided fluid's volume became equal to or greater than the known volume of the chemical delivery line 325. In one implementation, the control device 350 may determine the total time ($T_o$) by calculating the difference in the time in which the last flow rate measurement was received (step 440 of FIG. 4) and the time in which first flow rate measurement was received.

At step 520, the control device 350 may divide the total time ($T_o$) into two or more ('N') equal sized segments of time ($T_i$). In one implementation, the control device 350 may divide the total time ($T_o$) into segments such that each segment of time contains more than one flow rate measurement received from the flow meter 327.

At step 530, the control device 350 may calculate the standard deviation ($\sigma_i$) of the flow rate data stored in each time segment ($T_i$). In one implementation, the control device 350 may determine the standard deviation ($\sigma_i$) of the flow rates stored in each segment ($T_i$).

At step 540, the control device 350 may calculate the mean ($\mu_i$) of the data stored in each time segment ($T_i$). In one implementation, the control device 350 may determine the mean ($\mu_i$) of the flow rates stored in each segment ($T_i$).

At step 550, the control device 350 may calculate the standard deviation ($\sigma_{all}$) of all of the means calculated at step 540. In one implementation, the control device 350 may calculate the standard deviation ($\sigma_{all}$) of all the means of the flow rates in each time segment ($T_i$).

At step 560, the control device 350 may determine if the measurement data received by the control device 350 (step 440 of FIG. 4) is stable. If all of the calculated standard deviations ($\sigma_i$) in each time segment ($T_i$) is below a first predetermined standard deviation value, and if all of the calculated standard deviations for all of the means ($\sigma_{all}$) of the flow rates in each time segment ($T_i$) are below a second predetermined standard deviation value, the measurement data may be determined to be stable. In one implementation, the control device 350 may only evaluate the calculated standard deviation for each time segment ($T_i$) to determine that the measurement data is stable. In another implementation, the control device 350 may only evaluate the calculated standard deviation for all of the means calculated at step 540 ($\sigma_{all}$) to determine that the measurement data is stable.

Although method 500 has been described using the flow rate measurement data obtained from the flow meter 327, it should be understood that method 500 may also be used to determine the stability of the pressure based on the pressure measurements received by the pressure indicator 330. In one implementation, the pressure measurement data may be obtained from the pressure indicator 330, and the pressure may be determined to be stable if all of the calculated standard deviations ($\sigma_i$ and $\sigma_{all}$) are below a predetermined standard deviation value (e.g., less than one standard deviation). The stability of the pressure and flow rate measurement data may be used to indicate that the chemical delivery line 325 does not have a bubble stored therein.

Figure 6:
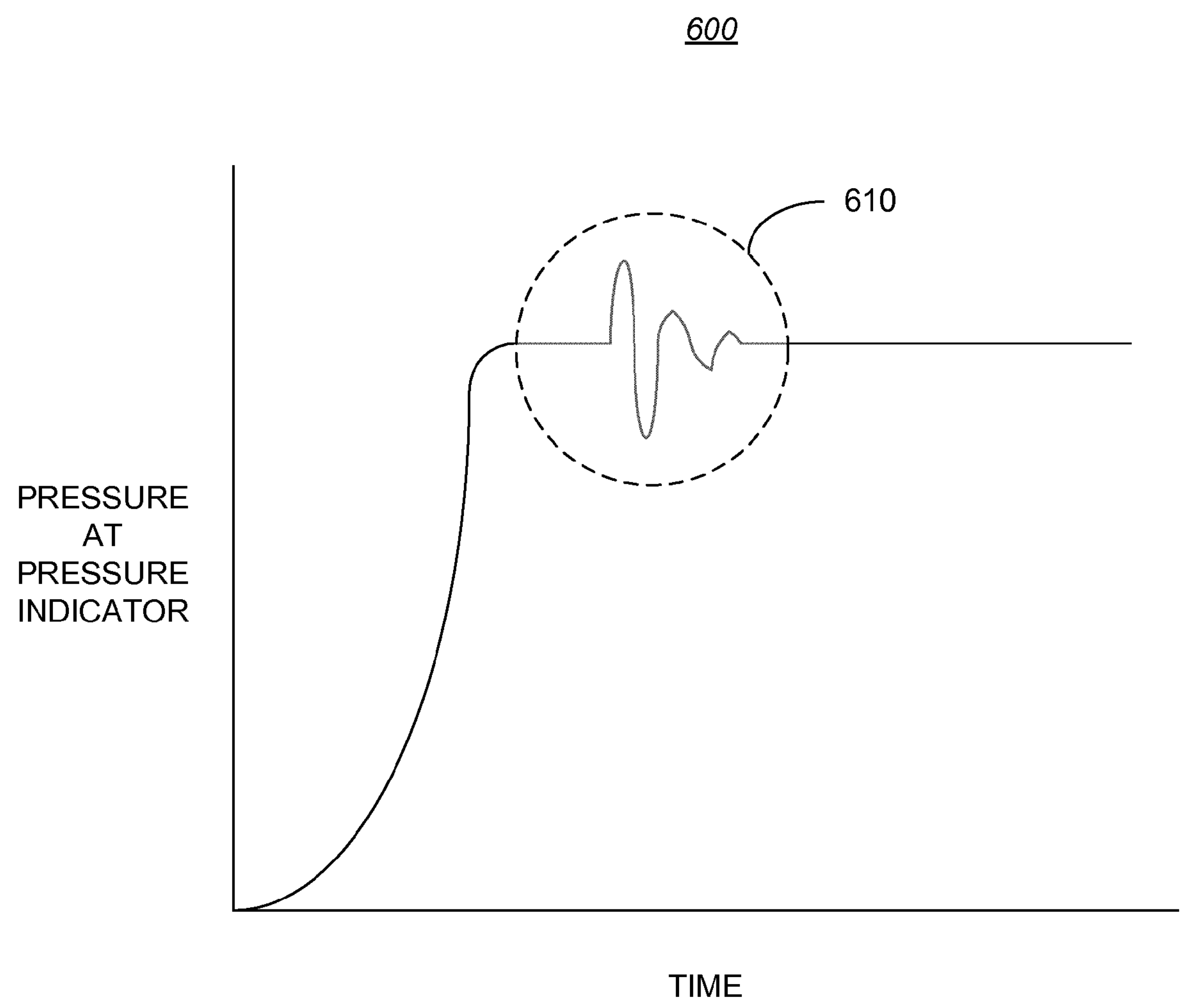
FIG. 6 illustrates a graph that may indicate the presence of a bubble in the chemical delivery line in accordance with implementations of various techniques described herein.

FIG. 6 illustrates a graph 600 that may indicate the presence of a bubble in the chemical delivery line in accordance with implementations of various techniques described herein. In one implementation, the graph may represent the pressure versus time characteristics of the chemical delivery line 325, where the pressure value may be obtained from the pressure indicator 330 over the time period in which the chemical dispense system is providing a chemical to the chemical delivery line 325.

At region 610 of graph 600, the illustrated spike or disturbance in the pressure values may indicate that a bubble existed in the chemical delivery line 325. Conversely, the illustrated constant pressure at region 620 may indicate that there are no bubbles in the chemical delivery line 325. Although graph 600 displays a spike or disturbance in the pressure values in the chemical delivery line 325, it should be noted that the flow rate data may also indicate the existence of an air bubble in the chemical delivery line 325 with a similar disturbance.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for preparing a chemical delivery line for delivery, comprising:
- starting a flow of a semiconductor solution through a syringe into the chemical delivery line, wherein the semiconductor solution comprises a chemical solution used in a semiconductor fabrication process;
- measuring a flow rate of the semiconductor solution flowing through the chemical delivery line;
- determining the volume of the semiconductor solution flowing through the chemical delivery line as a function of the flow rate and time; and
- performing a subsequent combinatorial process when the volume of the semiconductor solution is equal to or greater than the volume of the chemical delivery line, the subsequent combinatorial process varying a process condition across multiple regions of a substrate being processed.

2. The method of claim 1, wherein performing the subsequent process comprises stopping the flow when the volume of the semiconductor solution is equal to or greater than the volume of the chemical delivery line.

3. The method of claim 1, wherein measuring the volume of the semiconductor solution comprises:
- measuring a flow rate of the semiconductor solution flowing through the chemical delivery line; and
- integrating the flow rate as a function of time.

4. The method of claim 1, wherein the subsequent process is performed when a flow rate stability of the semiconductor solution flowing through the chemical delivery line is below a predetermined value.

5. The method of claim 4, wherein the flow rate stability of the semiconductor solution flowing through the chemical delivery line is determined by:
- determining an amount of time required to fill the volume of the chemical delivery line with the volume of the semiconductor solution;
- dividing the amount of time into equal sized time segments, each time segment having a plurality of flow rates measured therein;
- calculating a standard deviation between the flow rates in each time segment; and
- determining that the flow rate stability of the semiconductor solution is below the predetermined value when the standard deviation of the flow rates in each time segment is below a first predetermined standard deviation value.

6. The method of claim 5, further comprising:
- calculating a mean of the flow rates in each time segment;
- calculating a standard deviation between each mean of the flow rates in each time segment; and
- determining that the flow rate stability of the semiconductor solution is below the predetermined value when the standard deviation between each mean of the flow rates in each time segment is below a second predetermined standard deviation value.

7. The method of claim 1, wherein performing the subsequent process comprises stopping the flow of the semiconductor solution when a pressure stability in the chemical delivery line is below a predetermined value.

8. The method of claim 7, wherein the pressure stability is determined by:
- determining an amount of time required to fill the volume of the chemical delivery line with the volume of the semiconductor solution;
- dividing the amount of time into equal sized time segments, each time segment having a plurality of pressures measured therein;
- calculating a standard deviation between the pressures in each time segment; and
- determining that the pressure stability is below the predetermined value when the standard deviation between the pressures in each time segment is below a first predetermined pressure standard deviation value.

9. The method of claim 8, further comprising:
- calculating a mean of the pressures in each time segment;
- calculating a standard deviation between each mean of the pressures in each time segment; and
- determining that the pressure stability is below the predetermined value when the standard deviation between each mean of the pressures in each time segment is below a second predetermined pressure standard deviation value.

10. The method of claim 7, wherein the pressure stability is used to determine when bubbles have been removed from the chemical delivery line.

11. The method of claim 1, wherein performing the subsequent process comprises:
- defining multiple regions of a substrate;
- processing the multiple regions of the substrate in a combinatorial manner; and wherein processing the multiple regions comprises flowing the semiconductor solution across the multiple regions.

12. The method of claim 1, wherein performing the subsequent process comprises processing multiple regions without contamination from a residual semiconductor solution from a previous process.

13. A method for preparing a chemical delivery line for delivery, comprising:

starting a flow of a semiconductor solution through a syringe into the chemical delivery line, wherein the semiconductor solution comprises a chemical solution used in a semiconductor fabrication process;

determining whether a flow rate of the semiconductor solution flowing through the chemical delivery line has stabilized; and performing a subsequent combinatorial process when a flow rate stability of the semiconductor solution flowing through the chemical delivery line is determined to be below a predetermined value, the subsequent combinatorial process varying a process condition across multiple regions of a substrate being processed, wherein determining whether the flow rate has stabilized comprises:

receiving a flow rate value from a flow meter coupled to the chemical delivery line;

determining an amount of time required to fill a volume of the chemical delivery line with a volume of the semiconductor solution;

dividing the amount of time into two or more equal sized time segments;

calculating a standard deviation of the flow rates between each equal sized time segment;

calculating a mean of the flow rates between each equal sized time segment;

calculating a standard deviation of the means of the flow rate between each equal sized time segment; and determining that the flow rate is stable when the standard deviations of the flow rates in each equal sized time segment and the standard deviation of the means of the flow rate are below the predetermined standard deviation value.

14. The method of claim 13, wherein determining the amount of time comprises calculating a difference in time between a time in which a last flow rate was stored and a time in which a first flow rate time was stored.

15. A method for preparing a chemical delivery line for delivery, comprising:

receiving a volume of the chemical delivery line;

starting a flow of a semiconductor solution from a vessel to the chemical delivery line, wherein the semiconductor solution comprises a chemical solution used in a semiconductor fabrication process;

receiving a flow rate from a flow meter coupled to the chemical delivery line;

calculating a volume of the semiconductor solution being provided as a function of the flow rate and time;

checking for a pressure stability of the semiconductor solution in the chemical delivery line when the volume of the semiconductor solution is equal to or greater than the volume of the chemical delivery line; and performing a subsequent combinatorial process when the pressure is determined to be stable, the subsequent combinatorial process varying a process condition across multiple regions of a substrate being processed.

16. The method of claim 15, wherein calculating the volume of the semiconductor solution comprises:

receiving a flow rate from a flow meter coupled to the chemical delivery line; and integrating the flow rate as a function of time.

17. The method of claim 15, wherein checking for the pressure stability comprises:

receiving a pressure from a pressure indicator coupled to the chemical delivery line;

storing the pressure and a corresponding time in which the pressure was received; and determining that the pressure is stable.

18. The method of claim 17, wherein determining that the pressure is stable comprises:

determining an amount of time required to fill the volume of the chemical delivery line with the volume of the semiconductor solution;

dividing the amount of time into equal sized time segments;

calculating a standard deviation of the pressures stored in each equal sized time segment;

calculating a mean of the pressures stored in each equal sized time segment;

calculating a standard deviation of the pressure means; and determining that the pressure is stable when the standard deviations of the pressures stored in each equal sized time segment and the standard deviation of the pressure means are below a predetermined standard deviation value.

19. The method of claim 15, wherein performing the subsequent process comprises:

defining multiple regions of a substrate;

processing the multiple regions of the substrate in a combinatorial manner using semiconductor solution substantially without any interference from bubbles lodged inside the chemical delivery line.

20. A wet processing tool, comprising:

a vessel having a semiconductor solution contained therein, wherein the semiconductor solution comprises a chemical solution used in a semiconductor fabrication process;

a chemical delivery line coupled to the vessel through a syringe;

a shutoff valve coupled to the chemical delivery line, wherein the shutoff valve is configured to provide access between the vessel and the chemical delivery line;

a flow meter coupled to the chemical delivery line, wherein the flowmeter is configured to measure a flow rate of the semiconductor solution through the chemical delivery line;

a controller coupled to the flow meter and the shutoff valve, wherein the controller is configured to:

send a signal to the shutoff valve to start a flow of a semiconductor solution from the vessel into the chemical delivery line;

receive a flow rate from the flowmeter;

calculate the volume of the semiconductor solution flowing through the chemical delivery line by integrating the flow rate of the semiconductor solution as a function of time; and send a signal to the shutoff valve to stop the flow of the semiconductor solution when the volume of the semiconductor solution is equal to or greater than the volume of the chemical delivery line, the controller further configured to control a combinatorial process varying a process condition across multiple regions of a substrate being processed.

21. The wet processing tool of claim 20, wherein the controller is further configured to:

determine whether the flow rate of the semiconductor solution flowing through the chemical delivery line has stabilized; and send the signal to the shutoff valve to stop the flow of the semiconductor solution when the volume of the semiconductor solution is equal to or greater than the volume of the chemical delivery line and when the flow rate is determine to be stabilized.

22. The wet processing tool of claim 20, wherein the controller is further configured to:

check for a pressure stability in the chemical delivery line; and send the signal to the shutoff valve to stop the flow of the semiconductor solution when the volume of the semiconductor solution is equal to or greater than the volume of the chemical delivery line and when the pressure stability is below a predetermined value.

* * * * *